Oct. 17, 1961    R. B. HULL    3,004,644
ADJUSTABLE HANGER
Filed Jan. 30, 1959

INVENTOR.
Raouel B. Hull
BY
His Attorney 3,004,644
ADJUSTABLE HANGER
Raouel B. Hull, Anderson, Ind., assignor to General Motors Corporation, Detroit, Mich., a corporation of Delaware
Filed Jan. 30, 1959, Ser. No. 790,247
7 Claims. (Cl. 189—88)

This invention relates to adjustable links and hangers and more particularly to devices for adjustably supporting light weight false ceiling material of the type commonly used in offices, cafeterias and the like.

In present day building practice, it is common to provide false ceilings in various rooms of office buildings and plants. The usual method of supporting the false ceiling is to provide a frame on which the ceiling material is placed and the frame is in turn supported in some manner by the buildings.

In constructing a ceiling installation of the type described, considerable difficulty has been encountered in leveling the frame with respect to a known level plane. It is, accordingly, an object of this invention to provide a device for leveling a false ceiling installation which is effective to provide accurate leveling and which is simple in construction and operation.

Another object of this invention is to provide an adjustable link for false or suspended ceilings that includes a plate that is fitted with a rotatable stud, the stud having a head that is spaced from the plate, and wherein a cable is tightly wedged between the plate and head of the stud which prevents unwinding of the cable after the cable is wound on the stud.

Another object of this invention is to provide an adjustable link which has particular utility in supporting false ceilings and which comprises a plate carrying a rotatable stud, the shank of the stud being fitted with a washer that is positioned adjacent the plate and which provides a space between the head of the stud and the washer, there being a cable attached to the stud which is positioned in the space and wound up therein when the stud is rotated. When the cable is wound into the space, it is wedged into tight frictional engagement with the washer and head of the stud to prevent reverse turning of the stud and unwinding of the cable.

Further objects and advantages of the present invention will be apparent from the following description, reference being had to the accompanying drawings wherein preferred embodiments of the present invention are clearly shown.

Figure 1:
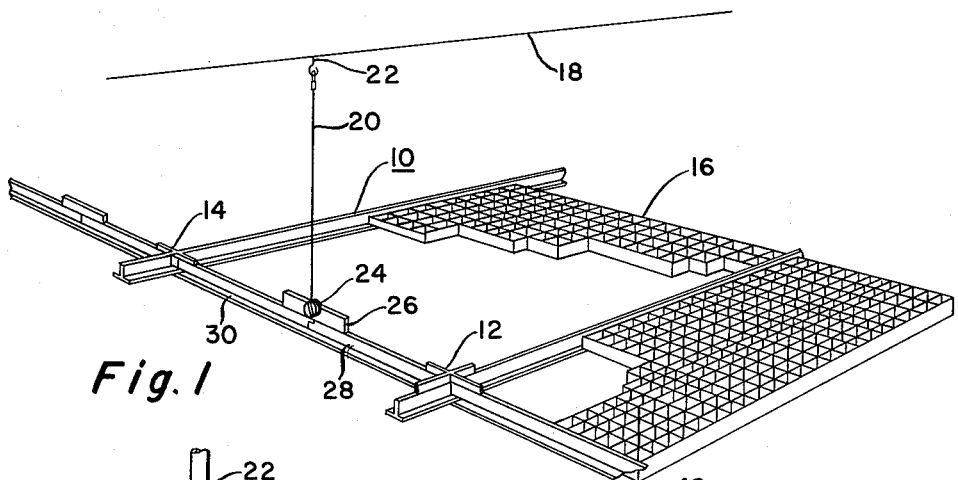
FIGURE 1 is a perspective view of a false ceiling installation employing the adjustable hanger of this invention.

Referring now to the drawings and more particularly to FIGURE 1, it is seen that the ceiling installation comprises a frame generally designated by reference numeral 10. The frame comprises metal T-shaped sections which are joined together at 12 and 14. It is to be appreciated that only a portion of the frame is shown in FIGURE 1 and that several other joints are required when installing a ceiling installation in a large room. The frame 10 supports ceiling material designated in its entirety by reference numeral 16. This ceiling material is relatively light-weight and is commonly used in offices, cafeterias and the like. If desired, the ceiling material may be perforated or louvered as shown. The ceiling installation is supported by a fixed support which, in this case, takes the form of a messenger cable 18 that may be strung from one end of the building to the other. It will be appreciated that the fixed support might take other forms such as steel girders and the like where they are available.

A steel cable 20 is secured to a hook 22 which is, in turn, secured to the messenger cable 18. The cable 20 has an end that is adapted to be wound on a rotatable stud 24 that is journalled for rotation in a T-shaped member 26. The rotatable stud 24 and T-shaped member 26 are illustrated in greater detail in FIGURES 2 through 5 and, as will become more readily apparent hereinafter, the frame 10 is adjusted relative to messenger cable 18 by rotation of the stud 24. It will be appreciated that several cables 20 will be required in order to support the frame 10 although only one of these has been illustrated in FIGURE 1.

Referring now more particularly to FIGURES 2 through 5, it is seen that the adjustable hanger of this invention comprises the stud 24 that is journalled in a metal T-shaped member 26. The T-shaped member 26 slidably fits T-shaped strut members 28 and 30 which form a part of the framework 10. As is readily apparent from the drawings, the struts 28 and 30 are simply slid onto the T-shaped member 26 so that member 26 operates as a joint for the other two T-shaped members.

The rotatable stud 24 has a shank portion 32 that is riveted or headed over as at 34 to prevent withdrawal of the stud 24 from the upright wall 33 of T-shaped member 26. The stud 24 has a head 36 of greater diameter than the shank portion 32 and this head portion is formed with a slot 38 that is adapted to receive the end of a screw driver. The head 36 of the stud is formed with a hole 40 which receives one end of the cable 20. A washer 42 is fitted to the shank portion 32 of the stud and is slidable thereon. The stud 24 and washer 42 are both formed of soft metal material such as aluminum and the cable 20 is preferably formed of steel.

Figure 5:
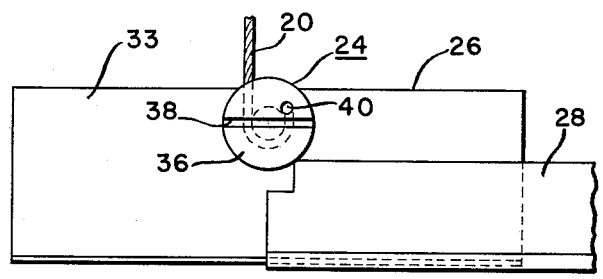
FIGURE 5 is a perspective view of the adjustable hanger of this invention.
Figure 5:
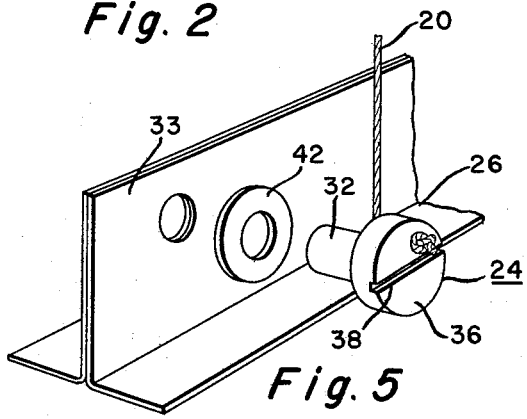

When it is desired to install a ceiling installation of the type described, one end of the cable 20 is threaded through the hole 40 in the head of stud 24 and the end of the cable is knotted as shown in FIGURE 5 or is otherwise secured to the head of the stud. The cable is then wound for the length of one or two turns in the space located between washer 42 and head 36 of the stud and the end of the stud is then riveted or headed over to wedge the cable between the head of the stud and the washer. When this is done, the cable is effective to force the washer 42 against the upright wall 33 of T-shaped member 26. After this is accomplished, the opposite end of the cable is attached to hook 22 with the length of cable being very nearly the exact length required to cause a level condition of the frame 10. With the cable in position as shown in FIGURE 1, the rotatable stud 24 is rotated and more cable is tightly wedged between the head 36 of stud 24 and the washer 42. This causes a tight frictional engagement between the washer 42 and the upright portion 33 of T-shaped member 26 and between the cable and head portion 36 of stud 24. It has been found that this frictional engagement is sufficient to prevent reverse turning of the rotatable stud 24 under the weight of the frame and ceiling material. The tight frictional engagement is achieved due to the fact that the spacing between washer 42 and the head 36 of stud 24 is of such a dimension as to just receive the cable 20, and this action is further enhanced by the steel cable biting into the softer aluminum washer and stud.

Although it is preferred to use the washer 42 in a manner described above, it is apparent that the cable might be wedged directly between the head 36 of stud 24 and the upright wall 33 of the T-shaped member 26. In such an installation the shank 32 is headed over or staked over in the same manner as before with the cable being wedged between wall 33 and head 36. This arrangement works particularly well where the plate 26 is formed of soft metal material such as aluminum and the cable formed of steel. Where the plate 26 is not formed of softer metal material than the cable and the washer 42 is not used, it is important that the hole in plate 26 be free of all burrs and sharp edges.

The method of leveling the ceiling material just described is extremely fast and simple as the stud 24 need only be rotated to accomplish leveling of frame 10. During the time that the stud 24 is being rotated, suitable level indicating devices may be used in order to determine when the frame is level.

Although the leveling of a false ceiling using the adjustable hanger of this invention may be done in various ways, it is preferred to first attach a plurality of hangers to the messenger cables with the length of cable 20 approximately equaling the desired distance between messenger cable 18 and the ceiling installation. After the hangers have been so suspended, the frame or strut members are attached to the various T-shaped members 26 and the entire framework is built up a little at a time. After a section of framework has thus been assembled and suspended, it may be leveled by simply rotating studs 24. Other sections of framework may then be added and these likewise leveled until the entire framework for the room is leveled and installed. It will of course be appreciated that this procedure may vary with the size of the room to which the ceiling is to be applied. In very small rooms the entire frame for the ceiling might be installed before any leveling takes place.

Figure 2:
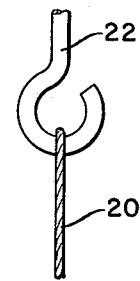
FIGURE 2 is an end view of the adjustable hanger of this invention.
Figure 3:
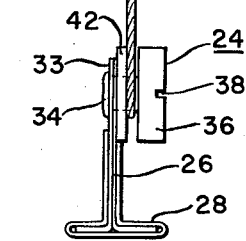
FIGURE 3 is a side view of the adjustable hanger of this invention.
Figure 4:
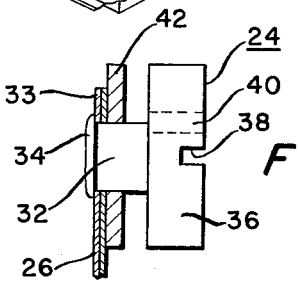
FIGURE 4 is an enlarged end view of a portion of FIGURE 2.

It is important to note that with the hanger of this device the center of gravity of the T-shaped member 26 is offset from the longitudinal axis of cable 20 when the T-shaped member is suspended as is evident from FIGURE 2. This tends to enhance the binding or wedging action of the cable between washer 42 and the head 36 of stud 24.

While the forms of embodiment of the present invention as herein disclosed constitute preferred forms, it is to be understood that other forms might be adopted.

What is claimed is as follows:

1. In a support for ceiling material, the combination comprising; a frame adapted to support a quantity of ceiling material, a fixed support, a plate member forming a portion of said frame, a stud rotatably carried by said plate member having a head portion and a shank portion of reduced diameter, a washer fitted on said shank portion and spaced from said head portion, a cable having one end thereof secured to said fixed support and having an opposite end thereof secured to said stud with a portion of said cable being fitted between said washer and the head portion of said stud and adapted to be wound on said stud when said stud is rotated, the distance between said washer and head portion being such that said cable is wedged therebetween, and means for restraining axial movement of said head portion away from said washer to maintain the cable wedged.

2. An adjustable hanger for use in supporting a false ceiling, comprising; a T-shaped plate member having an upstanding leg portion, a rotatable stud journalled for rotation in said upstanding leg member, said rotatable stud having a small diameter portion and a large diameter portion, said rotatable stud being restrained from axial movement with respect to said leg portion in a direction that would move said large diameter portion away from said leg portion, a washer slidably fitting said small diameter portion and engaging said upstanding leg member, and a cable having one end thereof secured to said large diameter portion and having a portion thereof wound on said small diameter portion, said cable being fitted in the space formed by said washer and large diameter portion of said stud, the distance between said washer and said large diameter portion and the relative diameter of said cable being such that the cable is wedged between the washer and said large diameter portion.

3. An adjustable link, comprising; a plate member, a rotatable member journalled for rotation in said plate member having a small diameter portion and a large diameter portion, a washer fitted on said small diameter portion engaging said plate member and spaced from said large diameter portion, said rotatable member being restrained from axial movement with respect to said plate member in a direction that would move said large diameter portion away from said plate member, and a cable having a portion thereof fixed to said large diameter portion and fitted in the space formed by said washer and large diameter portion, said cable having an outer diameter that is of a value to be just received in said space when said washer is in engagement with said plate member.

4. An adjustable link, comprising; a plate member, a rotatable member journalled for rotation in said plate member, and a cable having a portion thereof fixed to said rotatable member in such a manner that said cable is wound on said rotatable member when it is rotated, said rotatable member being restrained from axial movement with respect to said plate member in a direction that would move said rotatable member away from said plate member, and means causing said cable to be wedged against a surface of said rotatable member as it is rotated, the distance between said last named means and said surface of said rotatable member being such that the cable is wedged therebetween.

5. In a support for suspending ceiling material, the combination comprising; a frame adapted to support a quantity of ceiling material, a relatively fixed support, a plate member forming a portion of said frame, a rotatable stud fitted to said plate member having a head portion and a shank portion of reduced diameter, said rotatable stud being restrained from axial movement with respect to said plate member in a direction that would move said head portion away from said plate member, said head portion being spaced from a portion of said plate member, and a vertically extending cable having a portion thereof secured to said fixed support and having another portion thereof secured to said stud with a portion of said cable being wedged between said plate member and the head portion of said stud, the center of gravity of said plate member being offset from the longitudinal axis of said cable.

6. In a support for ceiling material, the combination comprising; a frame adapted to support a quantity of ceiling material, a cable, a relatively fixed support, a rotatable member journalled for rotation in a portion of said frame and fixed from axial movement with respect to said frame in at least one direction, means connecting a portion of said cable to said fixed support, the other end of said cable being connected with said rotatable member in such a manner that said cable is wound on said rotatable member when it is rotated, said rotatable member having a first friction surface, means defining a second friction surface that is spaced from said first friction surface, the distance between said friction surfaces and the relative diameter of said cable being proportioned such that the cable is wedged between the two friction surfaces to thereby prevent reverse rotation of said rotatable member when it is rotated in a direction to wind up the cable.

7. In a support for ceiling material, the combination comprising; a frame adapted to support a quantity of ceiling material, a cable, a relatively fixed support, a T-shaped plate member forming a portion of said frame having an upstanding leg portion, a rotatable member journalled for rotation in said upstanding leg portion having a larger diameter portion and a small diameter portion, means restraining said rotatable member from axial movement with respect to said leg portion in a direction that would move said large diameter portion away from said leg portion, means connecting a portion of said cable to said support, means connecting another portion of said cable with said rotatable member in such a manner that said cable is wound on said smaller diameter portion when it is rotated, and means causing said cable to be wedged against the larger diameter portion of said rotatable member as it is rotated, the distance between said last named means and the surface of said larger diameter portion that is engaged by said cable being such that the cable is wedged therebetween.

References Cited in the file of this patent

UNITED STATES PATENTS

| | | |
|---|---|---|
| 696,510 | Still | Apr. 1, 1902 |
| 2,752,017 | Segil | June 26, 1956 |